United States Patent
Rigsby et al.

(10) Patent No.: US 11,094,214 B1
(45) Date of Patent: Aug. 17, 2021

(54) ONLINE-BASED MICROCOURSES FOR LEARNING CORE SUBJECTS

(71) Applicants: John A Rigsby, Pensacola, FL (US); Jessica A Griffen, Pensacola, FL (US)

(72) Inventors: John A Rigsby, Pensacola, FL (US); Jessica A Griffen, Pensacola, FL (US)

( * ) Notice: Subject to any disclaimer, the term of this patent is extended or adjusted under 35 U.S.C. 154(b) by 572 days.

(21) Appl. No.: 15/815,623

(22) Filed: Nov. 16, 2017

(51) Int. Cl.
*G09B 5/14* (2006.01)
*G09B 7/00* (2006.01)
*G09B 5/06* (2006.01)

(52) U.S. Cl.
CPC .............. *G09B 5/14* (2013.01); *G09B 5/062* (2013.01); *G09B 5/065* (2013.01); *G09B 7/00* (2013.01)

(58) Field of Classification Search
CPC ........................................................ G09B 5/14
USPC ........................................................ 434/308
See application file for complete search history.

(56) References Cited

U.S. PATENT DOCUMENTS

| | | | | |
|---|---|---|---|---|
| 2012/0311438 A1* | 12/2012 | Cranfill | ................ | G06F 3/0488 715/256 |
| 2014/0032374 A1* | 1/2014 | Pfister | ................ | G06Q 30/0635 705/26.81 |
| 2014/0052659 A1* | 2/2014 | Karandikar | ................ | G09B 5/06 705/326 |
| 2014/0101068 A1* | 4/2014 | Gidugu | ................ | G06Q 10/00 705/327 |
| 2014/0242565 A1* | 8/2014 | Abts | ................ | G09B 5/00 434/350 |
| 2014/0253521 A1* | 9/2014 | Hicks | ................ | G06F 3/03545 345/179 |

* cited by examiner

*Primary Examiner* — Kesha Frisby
(74) *Attorney, Agent, or Firm* — Peter Loffler

(57) ABSTRACT

An online educational system for learning the core subjects of mathematics, social science, the sciences and English in a supportive curriculum via a universal learning design model is provided. The system breaks each subject down into sub-modules and bundles the courses for the sub-module, allowing a user to logically progress therethrough, although the user can select courses in any desired order. Each course is presented in visual, audio-visual or audio only fashion and can include sign language and text to speech functions. A user can take electronic notes within a course, can user portions of a course to create a POWERPOINT-type presentation for others, and can e-mail a teacher for questions with content specific information inserted into the e-mail to the teacher to provide specific subject matter content.

9 Claims, 9 Drawing Sheets

ONLINE-BASED MICROCOURSES FOR LEARNING CORE SUBJECTS

BACKGROUND OF THE INVENTION

1. Field of the Invention

The present invention relates to an online based learning system for delivering various courses to a user in eBook format wherein the courses cover various K-12 core subjects, namely mathematics, social studies, the sciences, and English, or other language arts for the country or region wherein the system is utilized.

2. Background of the Prior Art

The Internet has revolutionized education in ways unimaginable just a couple of decades ago. Knowledge and the ability to learn from sources around the world are just a click way delivered directly to a computer screen, either on a desk top or a mobile device. With a little bit of digging, just about anything that one wants to learn can be found at a level of understanding of the user's choosing.

Structured education is a part of the Internet revolution. Where previously one had to go to a classroom or buy a course book to learn a subject matter, the Internet brings such ability directly to the person's home. Again, almost any subject that is part of the structured educational system can be found somewhere on the net. The problem with such structured learning is that while one subject is relatively easy to find and download, a person desiring to advance through a subject across a relatively long span of time, such as a school semester, the person must continually research the net to hopefully find the entire span of the desired knowledge to be gained within the subject matter. This can prove quite time-consuming not only in finding the correct subject matter each time and hoping that the subject matter is presented in a similar format to the previously undertaken research, and is a quality presentation of the subject matter, but the person must now learn to navigate through the newest site wherein the new subject matter is located, which increases the time to complete a course of study and also has the ability to increase frustration levels, especially if a particular web site is difficult to navigate, is quirky, or is unstable during navigation. Often multiple windows must be open simultaneously in order to properly progress through a given subject. Additionally, such hunt and peck found web sites often lack any reasonable assessment tools to allow a user to gauge his or her progress and mastery through a given quantity of material.

What is needed is an online system that addresses the above noted shortcomings by providing a turnkey solution that allows a user to navigate through a course of study for a given subject matter without the need to continually research and find the next course within the chosen subject so that the user can seamlessly progress through a core subject matter in a standardized, easy to use format.

SUMMARY OF THE INVENTION

The online based microcourses for learning core subjects of the present invention addresses the aforementioned needs in the art by providing an online system that offers subject matter content driven learning tools delivered in an eBook format. Developed using the Universal Design for Learning (UDL) approach which takes into consideration the myriad of learning styles and challenges, the online based microcourses for learning core subjects addresses the innate shortcomings in traditional and non-traditional learning models and platforms. The online based microcourses for learning core subjects is a K-12 curriculum and subject matter based tool meant to enhance learning and practical understanding of every subject and sub-subject. The online based microcourses for learning core subjects is presented in an eBook format and synthesizes the traditional and essential aesthetic of learning peripherals, the book, with the new vehicle of comprehensive and practical learning via microcourses. The online based microcourses for learning core subjects is available in multiple languages, such as English, Spanish, and French and other languages. The online based microcourses for learning core subjects is designed to enhance and buttress the learning process, increasing the opportunity for greater learning outcomes. Although other learning platforms exist, before the advent of the online based microcourses for learning core subjects, there has never been a seamless and practical approach to exploring all core subject matter wrapped around the framework of a cultural and multicultural education system.

The online based microcourses for learning core subjects of the present invention allows a user to select a course of study, such as mathematics, social science, the sciences or English or other language arts (especially useful when the system is used in a non-English speaking locale), and logically progress through the course of study so as to allow the user to master a given subject matter. The subject matter is presented as a supportive curriculum which is defined as being content and culturally specific frameworks, tools, and methods designed to provide relevance, practicality, and applicability to a subject matter delivered in a universal learning design model that produces practical learners. The online based microcourses for learning core subjects compartmentalizes each core subject and allows a user to select a subset of the subject matter to progress through. This allows a user to select the subject to study and have the course laid out by the system in a logical concise fashion so that the user can progress through the subject matter naturally without worry about having the appropriate prerequisites to tackle a specific issue within the subject matter. The online based microcourses for learning core to subjects allows the user to customize the system for his or her learning level and adjust as needed as progress is made over time during system usage. Various presentation formats are available for progressing through each individual course within the subject matter, allowing the user to concentrate on the style and manner in which he or she learns best. Assessments are provided in order to allow a user to assess his or her mastery of a given subject or course before progressing to the next subject or course. The online based microcourses for learning core subjects has a standardized look and feel through all of the learning material so that the user need only learn to use the system once and thereafter use the functions as needed no matter where in a given subject matter or course the user might be found.

The online based microcourses for learning core subjects is comprised of a first database that has a first core subject matter record stored thereon with each first core subject matter record sub-grouped into a plurality of first subject records. Each subject record is sub-grouped into one or more first sub-content topic records stored on a storage device. A second database has a second core subject matter record stored thereon with each second core subject matter sub-grouped into a plurality of second subject records. Each subject record is sub-grouped into one or more second sub-content topic records stored on the storage device, such that the first core subject matter is different relative to the second core subject matter. A computer has a presentation device, which is either an audio transmitter or a visual display, and is communicatively linked to the storage device such that when the computer puts a call to the storage device for the first database for the first core subject matter record matter, each of the first subject matter records is presented on the presentation device. When the computer puts a call to the storage device for a specific first subject record, all of the first sub-content topic records of that specific first subject record are displayed on the presentation device. When the computer puts a call to the storage device for a specific first sub-content topic record, the contents of the specific first sub-content record are displayed on the presentation device. When the computer puts a call to the storage device for the second database for the second core subject matter record matter, each of the second subject matter records is presented on the presentation device. When computer puts a call to the storage device for a specific second subject record, all of the second sub-content topic records of that specific second subject record are displayed on the presentation device. When the computer puts a call to the storage device for a specific second sub-content topic record, the contents of the specific second sub-content record are displayed on the presentation device. Each of the first sub-content topic records and each of the second sub-topic records are presented on the visual display in an eBook (Electronic Book) format as an eBook. A core subject matter completion matter record containing a data set of progress through the first core subject matter record and the second core subject matter record is stored on the storage device. When the computer puts in a call to the storage device for the core subject matter completion record, the visual display device displays the data set as a percentage of completion of the first core subject matter record and the second core subject matter record. A first subject completion record containing a first data set of progress through each of the first subject records and a second subject completion record containing a second data set of progress through each of the second subject records are stored on the storage device. When the computer puts in a call for the storage device for the first subject completion record, the visual display device displays the contents of the first data set as a percentage of completion, individually for each of the first subject records and when the computer puts in a call to the storage device for the second subject completion record, the visual display device displays the contents of the second data set as a percentage of completion, individually for each of the second subject records. A first sub-content topic completion record containing a first data set of progress through each of the first sub-content topic records and a second sub-content topic completion record containing a second data set of progress through each of the second sub-content topic records are stored on the storage device. When the computer puts in a call for the storage device to the first sub-content topic completion record, the visual display device displays the contents of the first data set as a percentage of completion, individually for each of the first sub-content topic records and when the computer puts in a call to the storage device for the second sub-content topic completion record, the visual display device displays the contents of the second data set as a percentage of completion, individually for each of the second sub-content topic records. The computer can place a an electronic note or a book mark at a desired location within the eBook. The computer can send an e-mail to an external source (an external e-mail address) from a desired location within the eBook, such that the e-mail contains a specific set of data contained at the desired location. The computer has a hyperlink to the Internet such that the hyperlink is triggered from a desired location within the eBook and the hyperlink links to a set of linked records that correspond to a set of data contained at the desired location. Each of the first sub-content topic records and each of the second sub-topic records can also presented on the presentation display in a streaming fashion as a content stream embedded within a portion of the EBook. E-mails, book marks or notes and hyperlinks can also be performed by the computer within the content stream.

DESCRIPTION OF THE PREFERRED EMBODIMENT

Figure 1:
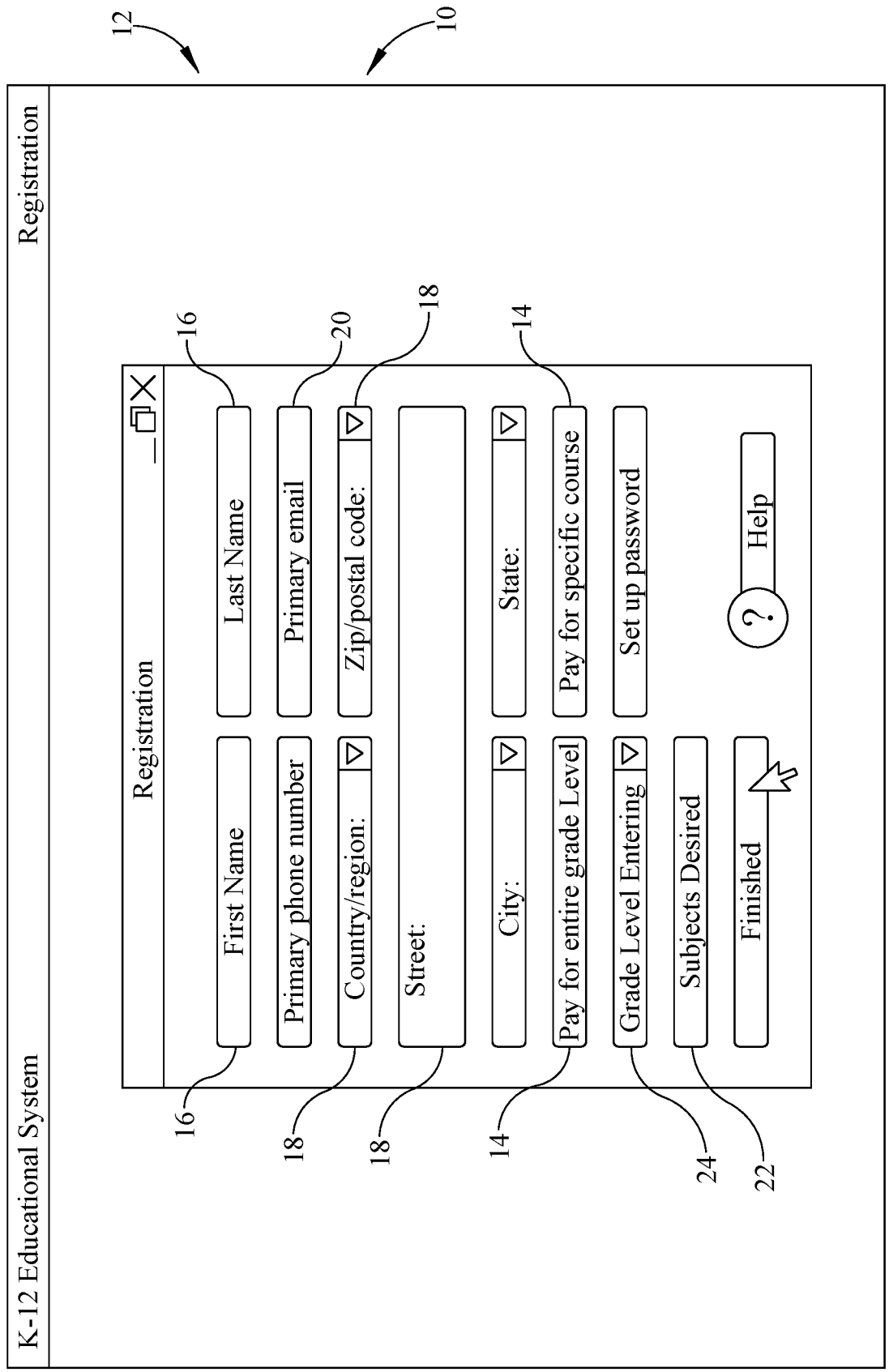
FIG. 1 is a screenshot illustration of a typical registration page that is used with the online based microcourses for learning core subjects of the present invention.
Figure 2:
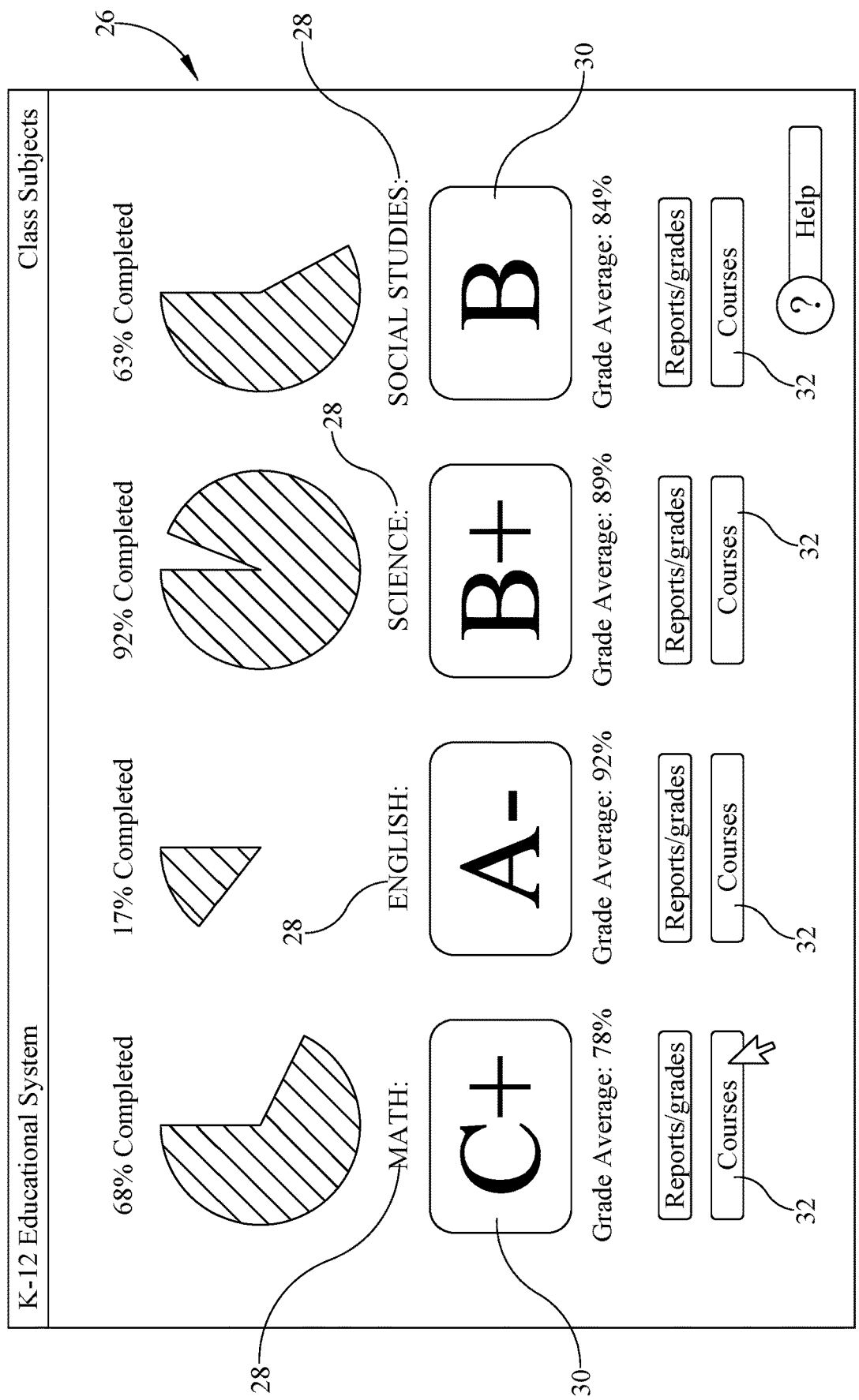
FIG. 2 is a screenshot illustration of a main overview page of the online based microcourses for learning core subjects.

Referring now to the drawings, it is seen that the online based microcourses for learning core subjects of the present invention, generally denoted by reference numeral 10, is comprised of a web-based system that has a typical front end dashboard 12 wherein a user can either register or log in using appropriate username and password or other appropriate login methodology if already registered. During registration, the online based microcourses for learning core subjects 10 may have an appropriate payment module 14 wherein a user pays for his or her usage of the online based microcourses for learning core subjects 10 (or provides an appropriate code, etc.,). The front end 12 allows a user to provide appropriate information, such as name 16, physical address 18, e-mail address 20, subject(s) desired to learn 22, education level and abilities 24, etc. A second level of the dashboard 26, illustrated in FIG. 2, also keeps track of the user's use of the online based microcourses for learning core subjects 10 so that a user can check on specific core subjects 28 that have been taken (including any assessments 30) as well as a link to the specific courses 32 within the core subjects 28.

Figure 3:
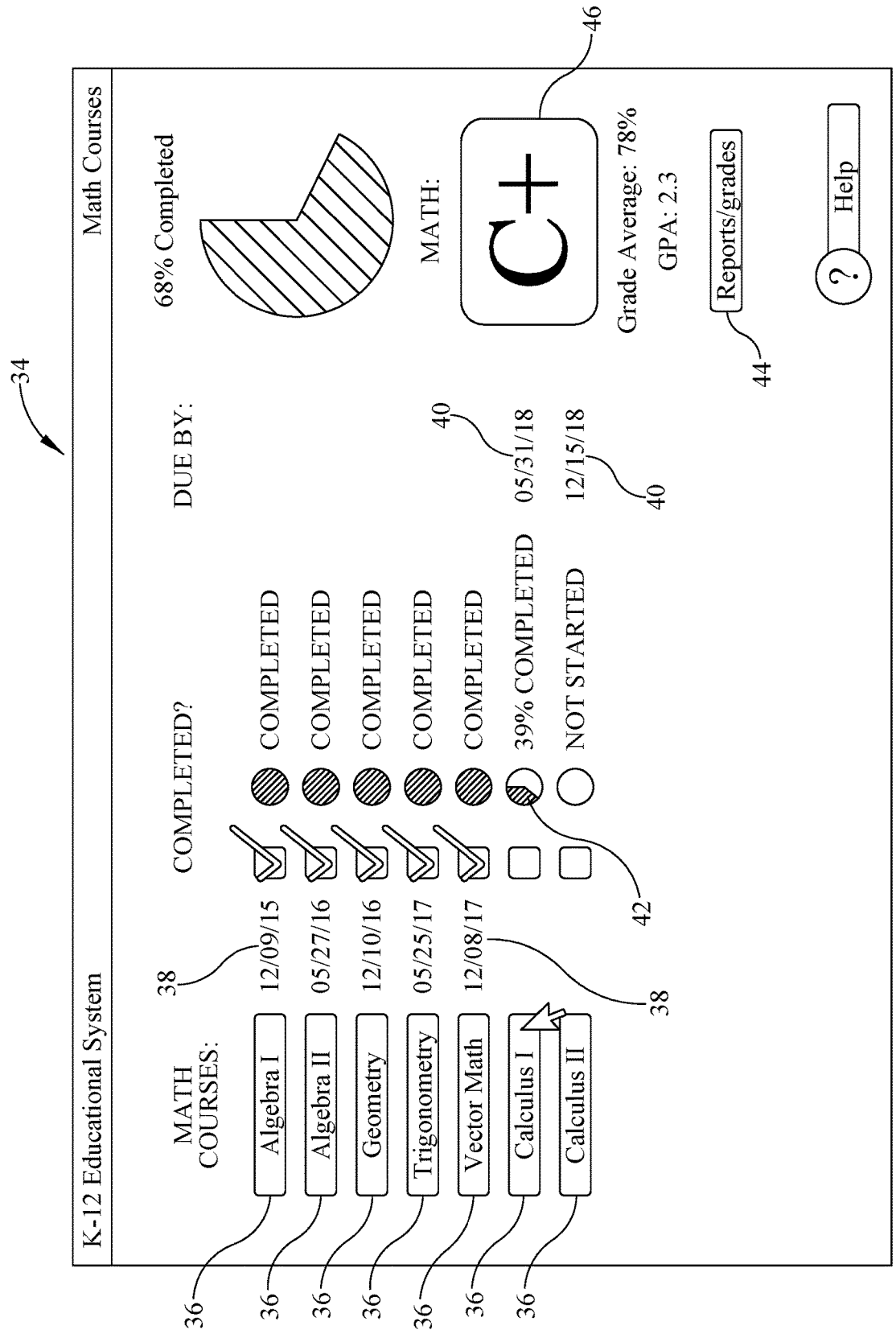
FIG. 3 is a screenshot illustration of a main overview page for a specific core subject module, by way of example, mathematics, of the online based microcourses for learning core subjects.

Following the link to a specific course 28 takes the user to a core subject module screen 34, as seen in FIG. 3, and by way of example, mathematics. In the core subject module screen 34, the user is presented with specific subjects 36 for that core subject. This module also shows the user when a specific subject 36 was taken 38 or by when the specific subject course should be completed by 40, progress 42 through a given specific subject course, and if the progress is ahead, on time, or behind a set schedule (if provided), next course in the progression, courses signed up for or paid for (if the system has some form of segmented payment structure—of course the online based microcourses for learning core subjects 10 can be configured in numerous ways such as al a carte pricing, subject matter pricing for a given set of courses, run of the house (either the entire house or for a given education level such as all courses at the $9^{th}$ and $10^{th}$ grade level), which run of the house may be open or for a given time, etc., and each user may be registered on a different plan all under the control of the system administrator), etc. The core subject module screen 34 can produce various reports 44 for a user including any certifications that might accompany a given course of study through a subject matter so that the user can deliver the certification to a third party as needed. Transfer of such reports for subsequent use can be in any appropriate fashion such as via e-mail, text message, etc. The core subject course module can also give a user grading information 46 for that core subject.

Figure 4:
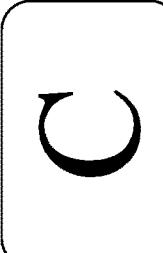
FIG. 4 is a screenshot illustration of a main overview page of one of the courses, by way of example, calculus I, of the core subject module of FIG. 3, in list display.
Figure 5:
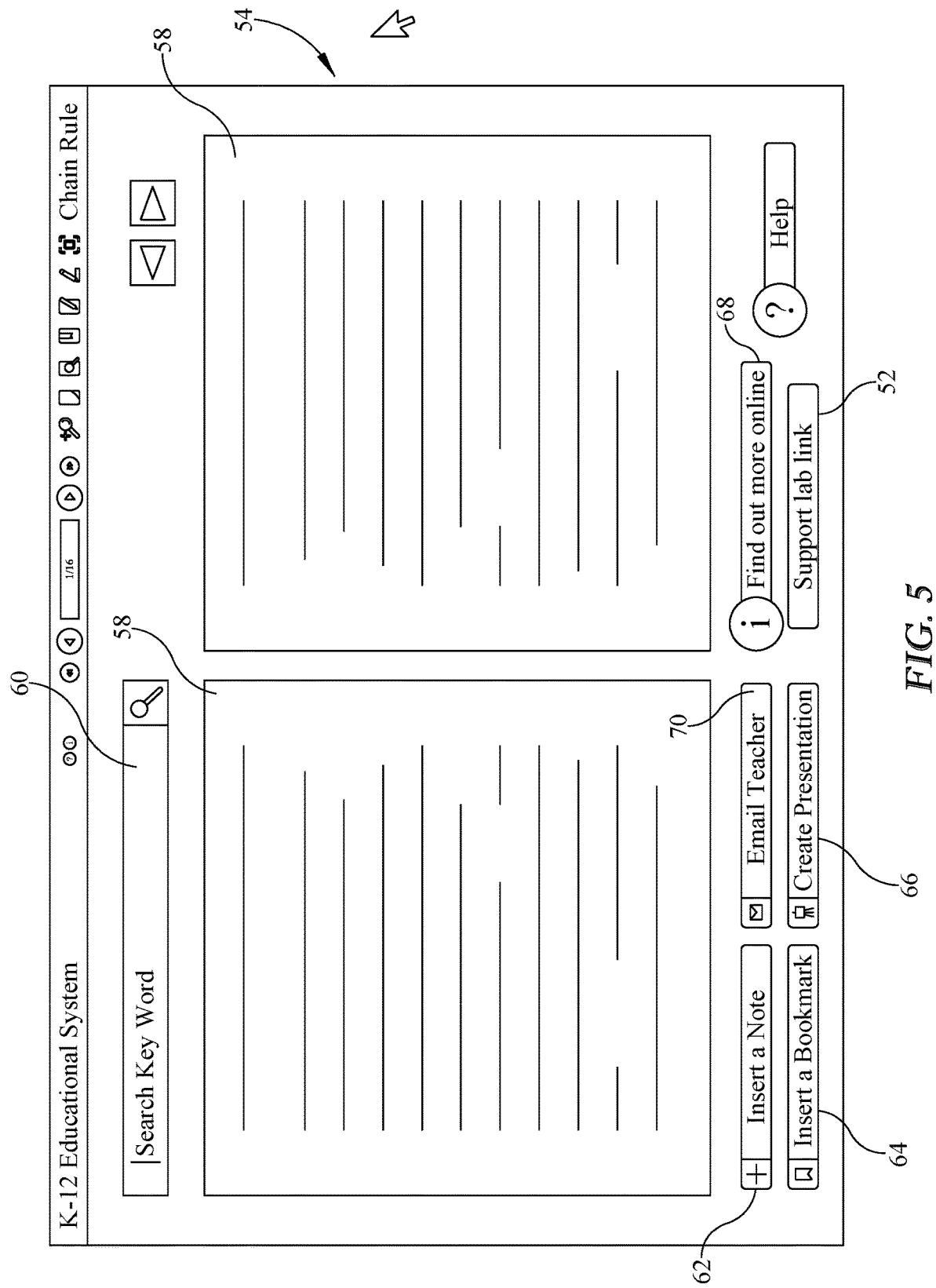
FIG. 5 is a screenshot illustration of a schematic layout of a course being presented in EBook fashion.

Once a user logs into the online based microcourses for learning core subjects 10 and goes to the substantive module of the system, the user is presented with the available core courses matter for study. The user can choose how to view the available courses. For example, the online based microcourses for learning core subjects 10 can present a high-level view of the core courses available, such as the illustrated mathematics, social science, the sciences, or English (or other language arts). The user can select a given subject, for example mathematics, and the online based microcourses for learning core subjects 10 then presents the mathematics subjects 36 via the core subject matter screen 34. The user can then drill down list (or thumbnails, etc.,) of sub-content topics within the mathematics subject 36, such as, for example, Calculus 1 presented in a subject screen 48 as seen in FIG. 4. As seen, in the subject screen 48, the user is presented all of sub-content topics 50 within the Calculus 1 subject 36, allowing the user to view each individual sub-content topic 50 within the specific subject 36 in a drill down method. If desired, these individual courses can be presented with a proposed progress schedule for timely working through the sub-content topic 50. Within the subject screen 48, the user can select each drill down list of sub-content topics 50 for details on the course such as the summary table of contents, what is covered, what the required or suggested prerequisites are, any tools made available online, etc., or the user can simply select a sub-content topic 50 within a subject 36 and begin work. When working within a sub-content module 50, the user can begin at the first sub-content module 50 and proceed in sequence or can immediately jump to an intermediate course, if desired. A user can also access the support lab at any time by clicking the support lab link 52 at the bottom of each page of the sub-content module 50 to obtain additional assistance with the subject matter. As the user completes each individual sub-content topic 50, the online based microcourses for learning core subjects 10 progresses to the next sub-content topic 50 in the sub-module automatically, but the user is free to either skip this next sub-content topic 50 or bounce around as he or she sees fits, allowing for full customization of progress. Alternately, if a user enters the mathematics module, each available drill down sub-content topic 50 can be presented allowing the user to scan through all available sub-content topics 50 within a core subject module 34 in mathematics. A searching option is available as is a filtering option (again, the online based microcourses for learning core subjects 10 can be configured so that a given user only has access to a subset of the core subject courses 34 available or subjects 36 within a core subject course 34 or even sub-content topics 50 within a subject 36 so in such a scenario, only the subjects 36 and sub-content modules 50 available to the given user would be presented—of course, the user can have access to other core subject courses 34 or even subjects 36 or sub-content modules 50 currently not available to the user so that the user can select such courses in appropriate fashion and register as needed with payment for the extra courses in the dashboard. The user can also broaden the scope of desired courses in his or her dashboard, such as adding extra grade levels of courses that the user wants to participate in, etc., at any time. Any courses already taken by a user can be marked in some easily identifiable fashion. The user can then select a given subject 36 from the list and begin work. When a subject 36 is completed, the user can simply go back to the list page or the online based microcourses for learning core subjects 10 can progress, either automatically or via suggestion to the user of the next logical subject 36 in the linage of study. Of course, the user is free to bounce around between subjects 36 as desired. The courses themselves are presented on the user's screen (which can be a desk top, laptop, appropriate handheld electronic device such as a smartphone, etc.), in a single window. The user can select the desired delivery format of each course (either course by course, or via configuration in the dashboard).

Each sub-content topic 50 within a microcourse is presented as an eBook including a series of pages 58, often with a facilitator, as opposed to a stream, such as a professor teaching. The online based microcourses for learning core subjects 10 allows for an auto flipping mode between pages or allows the user to manually advance to each next page including the ability to jump direct to a page out of sequence. Each sub-content topic 50 within a subject 36 may present keyword searching links 60. The course allows a user to take online notes 62 and have the notes stored at given location within the course (for example, a note can be stored on the $17^{th}$ page of the course)—book marks 64 can be similarly inserted. The user can create POWERPOINT (Microsoft Corporation, Redmond Wash.), or similar type of files for use in his or her own presentations 66 to others. Hyperlinks 68 for additional research can be provided within a course or at the end of the course in a bibliography, if provided, or simply as a way to allow a user to further explore a given subject matter. Such hyperlinks are designed to link to a web page that is either age or skill or educational level appropriate for the user utilizing the particular course within which the hyperlinks are located. As noted previously, each sub-content topic 50 is linked to a support lab 52, which contains additional subject materials to assist the user in understanding a subject matter. An e-mail link 70 to the teacher can also be provided, with such e-mail that is sent having appropriate sub-content topic identification within the e-mail to allow the teacher to identify from whereat the student sent the e-mail to better address the question contained in the e-mail.

Figure 6:
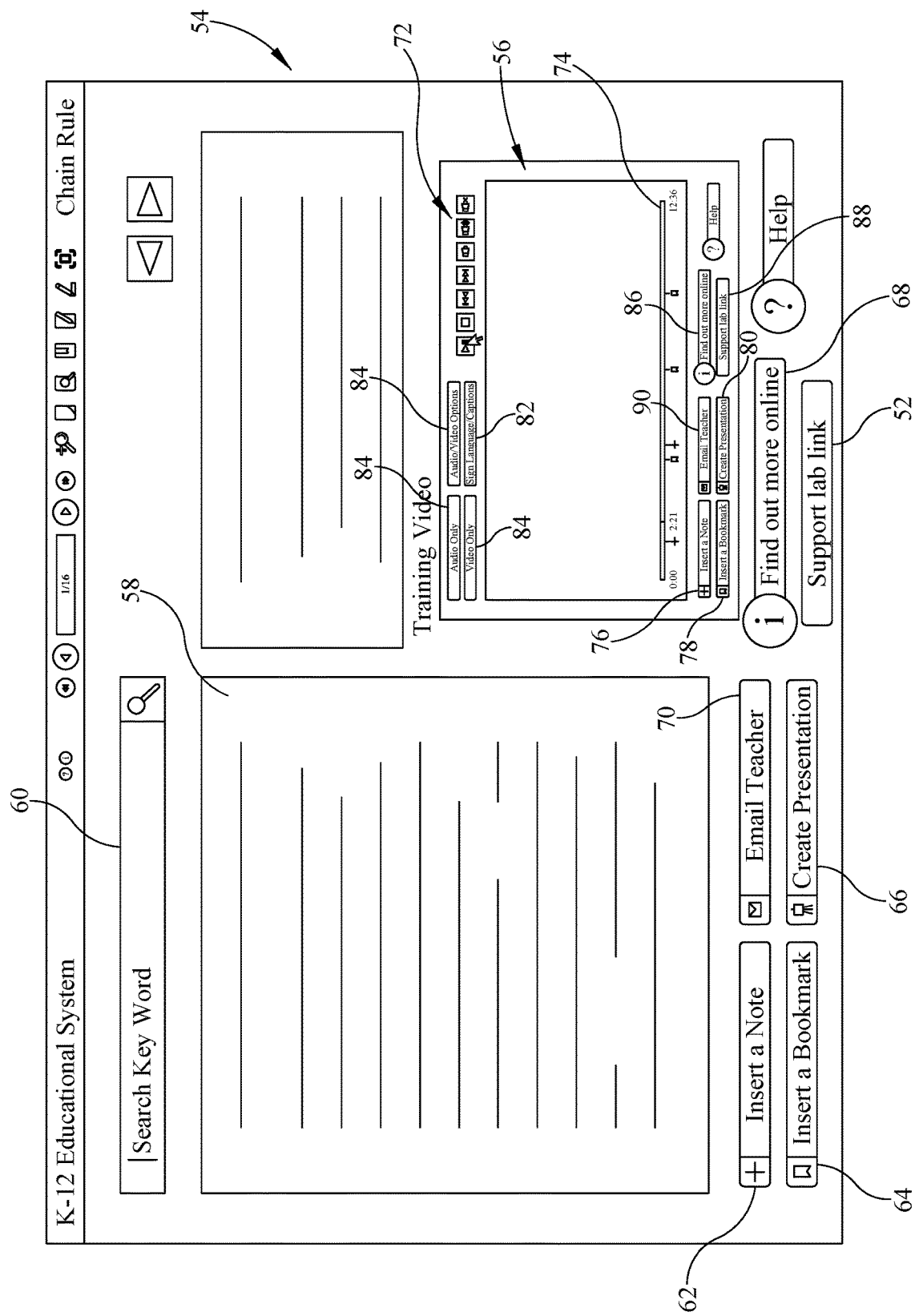
FIG. 6 is a screenshot illustration of a course having a training video embedded within the EBook.
Figure 7:
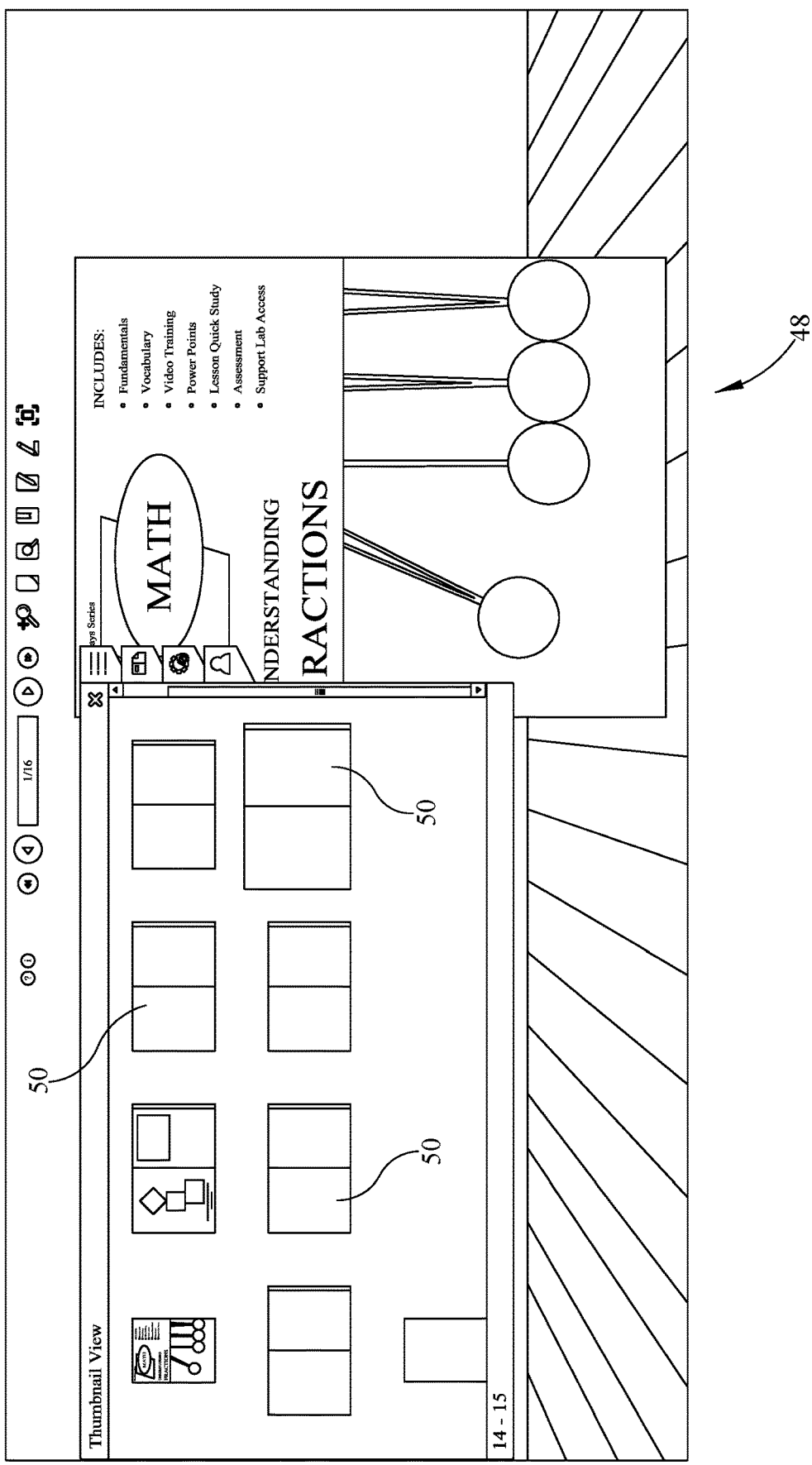
FIG. 7 is a screenshot illustration of a main overview page of one of the courses, by way of example, fractions, of the core subject module of FIG. 3 in thumbnail display.
Figure 8:
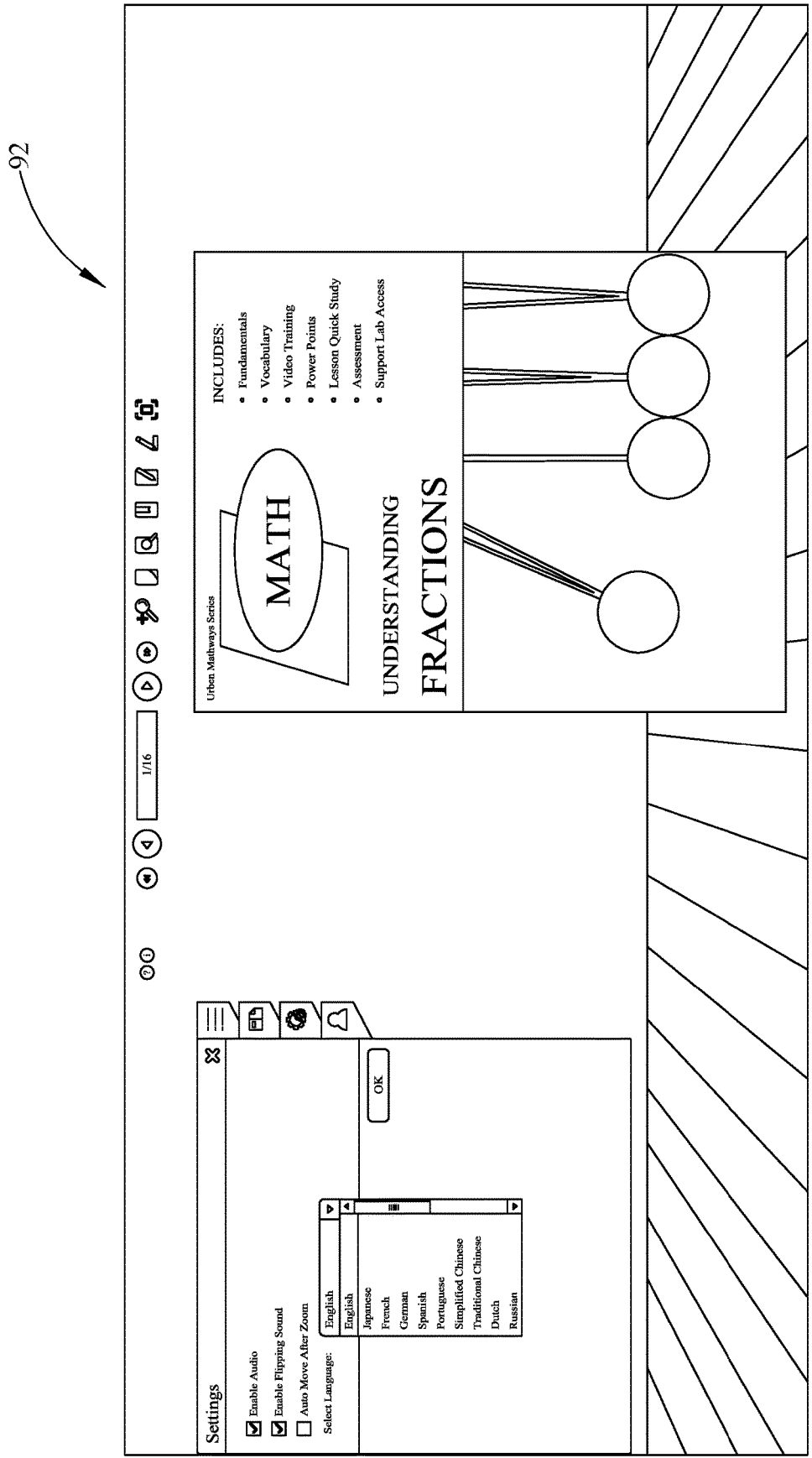
FIG. 8 is a screenshot illustration of a configuration page.
Figure 9:
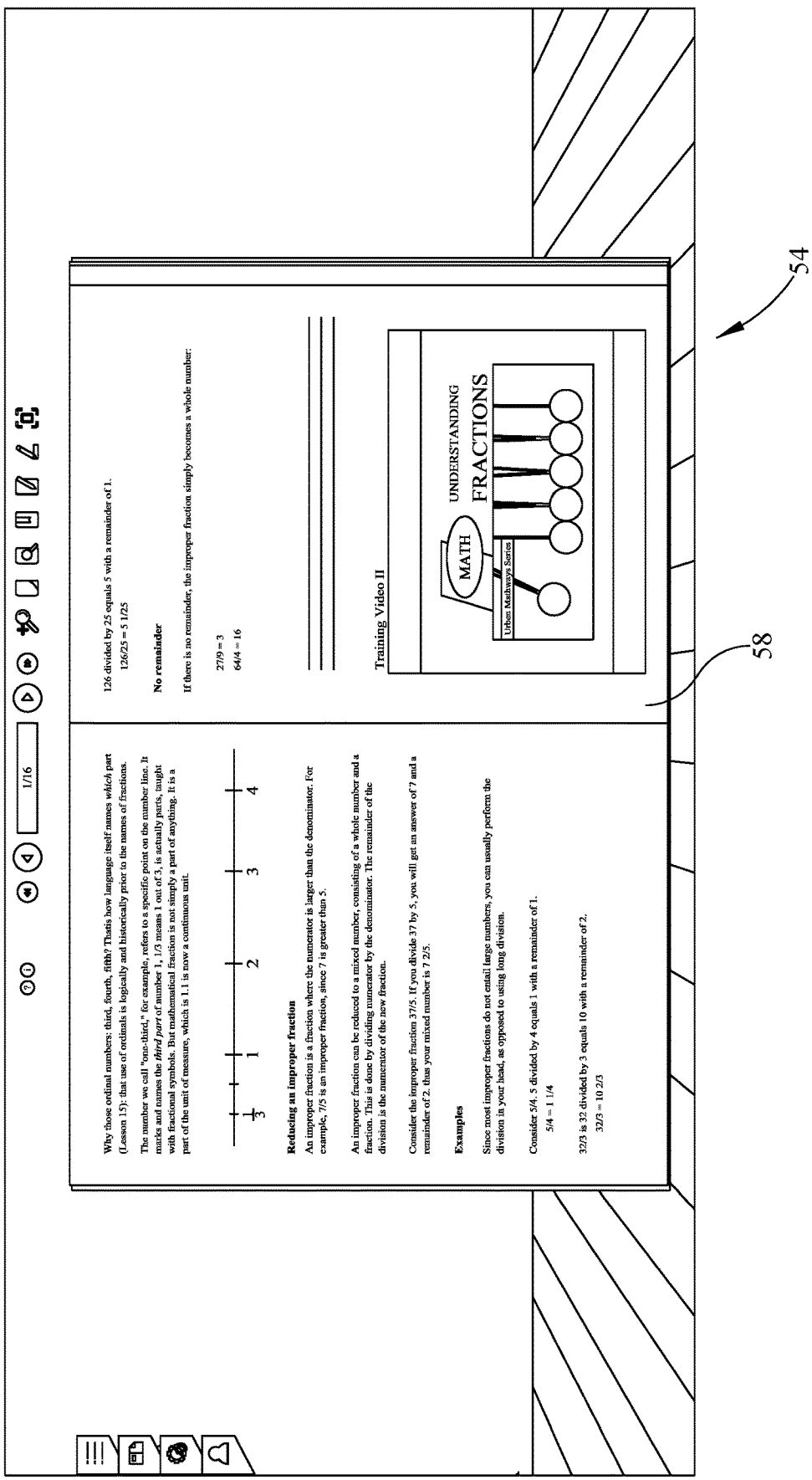
FIG. 9 screenshot illustration of a course being presented in EBook fashion Similar reference numerals refer to similar parts throughout the several views of the drawings.

As seen in FIGS. 6 and 9, within a microcourse, a training video 56 may be presented as a stream such as a professor teaching. The training video 56, may be embedded within the course proper, or may be called by the user for extra help on a given topic. Each sub-content topic 50 within a subject 36 may present keyword searching links 60. This format allows the user to progress through the video stream in appropriate streaming fashion via appropriate control keys 72 (stop, play, pause, fast forward, etc.,) and may have an appropriate timing bar 74. The course allows a user to take online notes 76 and have the notes stored at given location within the course (for example, a note can be stored at the 3 minute 43 second mark of a lecturer's streamed presentation)—book marks 78 can be similarly inserted. The user can create POWERPOINT (Microsoft Corporation, Redmond Wash.), or similar type of files for use in his or her own presentations 80 to others. Each course can be sign language interpreter enabled 82 for visual viewing by the hearing impaired and can also convert text to speech for the visually impaired or simply someone who wants to listen to a course, or a portion thereof, via audio, such as a person who must drive somewhere midway through a course with appropriate controls 84 for selecting audio, visual, or audio-visual presentation provided. Hyperlinks 86 for additional research can be provided within a course or at the end of the course in a bibliography, if provided, or simply as a way to allow a user to further explore a given subject matter. Such hyperlinks are designed to link to a web page that is either age or skill or educational level appropriate for the user utilizing the particular course within which the hyperlinks are located. As noted previously, course is linked to a support lab 88, which contains additional subject materials to assist the user in understanding a subject matter. An e-mail link 90 to the teacher can also be provided, with such e-mail that is sent having appropriate sub-content topic identification within the e-mail to allow the teacher to identify from whereat the student sent the e-mail to better address the question contained in the e-mail.

Advantageously, although not necessarily, each sub-content topic 50 is designed to be relatively short, one hour or under, in order to allow a user to be able to conquer a given subject and reduce the time a user spends on a given subject, especially one not especially liked by the user.

The entire system is appropriately stored on one or more servers, either the administrator's servers or in the cloud. The online based microcourses for learning core subjects can run on various platforms. An appropriate administration module is provided to allow the various administration tasks that are commonly performed, such as adding, deleting or updating a course, changing the courses within a given sub-module, adding and deleting students, monitoring the payment module, communicating with users for various matters, report production, etc.

Of course, help screens are provided as appropriate as are how-to-use videos for using various components of the online based microcourses learning core subjects 10, as is an appropriate configuration page 92 for configuration of the course presentation for the user.

While the invention has been particularly shown and described with reference to an embodiment thereof, it will be appreciated by those skilled in the art that various changes in form and detail may be made without departing from the spirit and scope of the invention.

We claim:

1. An online educational computer system comprising:
a first database having a first core subject matter record stored thereon, each first core subject matter record sub-grouped into a plurality of first subject records, and each subject record sub-grouped into one or more first sub-content topic records stored on a storage device;
a second database having a second core subject matter record stored thereon, each second core subject matter sub-grouped into a plurality of second subject records, and each subject record sub-grouped into one or more second sub-content topic records stored on the storage device, such that the first core subject matter is different relative to the second core subject matter; and
a computer having a presentation device, either an audio transmitter or a visual display, or both, the computer linked to the storage device such that when the computer puts a call to the storage device for the first database for the first core subject matter record matter, each of the first subject matter records is presented on the presentation device, when the computer puts a call to the storage device for a specific first subject record, all of the first sub-content topic records of that specific first subject record are displayed on the presentation device, and when the computer puts a call to the storage device for a specific first sub-content topic record, the contents of the specific first sub-content record are displayed on the presentation device, and when the computer puts a call to the storage device for the second database for the second core subject matter record matter, each of the second subject matter records is presented on the presentation device, when the computer puts a call to the storage device for a specific second subject record, all of the second sub-content topic records of that specific second subject record are displayed on the presentation device, and when the computer puts a call to the storage device for a specific second sub-content topic record, the contents of the specific second sub-content record are displayed on the presentation device such that each of the first sub-content topic records and each of the second sub-topic records are presented on the visual display in an eBook format as an eBook wherein the eBook has a series of pages that are flipped in paper book fashion as progress is made through each of the first sub-content topic records and each of the second sub-topic records and such that a note is placed on a page of the eBook wherein the computer sends an e-mail to an external source from a desired page within the eBook, such that the e-mail contains a specific set of data contained at the desired page.

2. The online educational computer system as in claim 1 further comprising a core subject matter completion matter record containing a data set of progress through the first core subject matter record and the second core subject matter record stored on the storage device such that when the computer puts in a call to the storage device for the core subject matter completion record, the visual display device displays the data set as a percentage of completion of the first core subject matter record and the second core subject matter record.

3. The online educational computer system as in claim 1 further comprising a first subject completion record containing a first data set of progress through each of the first subject records and a second subject completion record containing a second data set of progress through each of the second subject records are stored on the storage device such that when the computer puts in a call for the storage device to the first subject completion record, the visual display device displays the contents of the first data set as a percentage of completion, individually for each of the first subject records and when the computer puts in a call to the storage device for the second subject completion record, the visual display device displays the contents of the second data set as a percentage of completion, individually for each of the second subject records.

4. The online educational computer system as in claim 1 further comprising a first sub-content topic completion record containing a first data set of progress through each of the first sub-content topic records and a second sub-content topic completion record containing a second data set of progress through each of the second sub-content topic records are stored on the storage device such that when the computer puts in a call for the storage device to the first sub-content topic completion record, the visual display device displays the contents of the first data set as a percentage of completion, individually for each of the first sub-content topic records and when the computer puts in a call to the storage device for the second sub-content topic completion record, the visual display device displays the contents of the second data set as a percentage of completion, individually for each of the second sub-content topic records.

5. The online educational computer system as in claim 1 wherein the computer has a hyperlink to the Internet such that the hyperlink is triggered from a desired location within the eBook and the hyperlink links to a set of linked records that correspond to a set of data contained at the desired location.

6. The online education computer system as in claim 1 wherein each of the first sub-content topic records and each of the second sub-topic records are also presented on the presentation display in a streaming fashion as a content stream embedded within a page of the EBook.

7. The online educational computer system as in claim 6 wherein the computer sends an e-mail to an external source from a desired location within the content stream, such that the e-mail contains a specific set of data contained at the desired location.

8. The online educational computer system as in claim 6 wherein the computer has a hyperlink to the Internet such that the hyperlink is triggered from a desired location within the content stream and the hyperlink links to a set of linked records that correspond to a set of data contained at the desired location.

9. The online educational computer system as in claim 6 wherein the computer displays a sign language interpretation on the visual display that corresponds to an audio portion of the content stream.

* * * * *